United States Patent
Gentiluomo

[11] Patent Number: 5,104,126
[45] Date of Patent: Apr. 14, 1992

[54] GOLF BALL

[76] Inventor: Joseph A. Gentiluomo, 1456 Belmont Ave., Schenectady, N.Y. 12308

[21] Appl. No.: 726,749

[22] Filed: Jul. 8, 1991

[51] Int. Cl.$^5$ ............................................. A63B 37/00
[52] U.S. Cl. ................................... 273/228; 273/220; 273/230
[58] Field of Search ................. 273/62, 220, 218, 230, 273/228, 219

[56] References Cited

U.S. PATENT DOCUMENTS

| | | | |
|---|---|---|---|
| 719,499 | 2/1903 | Painter | 273/230 |
| 1,591,117 | 7/1926 | Floyd | 273/220 |
| 4,085,937 | 4/1978 | Schenk | 273/220 |
| 4,625,964 | 12/1986 | Yamada | 273/230 |
| 4,848,770 | 7/1989 | Shama | 273/230 |
| 5,048,838 | 9/1991 | Chikaraishi et al. | 273/230 |

Primary Examiner—William H. Grieb
Assistant Examiner—Steven B. Wong

[57] ABSTRACT

A multi-piece molded golf ball which closely duplicates the aerodynamic characteristics of a top grade wound type golf ball. The ball comprises a dense center having a minimum specific gravity of 1.25; a molded encapsulating mass surrounding the center, wherein the material in contact with the center is further characterized as a low density resilient synthetic elastomer composition; and a patterned surface contouring of predetermined structure, contained within the outer surface of the golf ball.

5 Claims, 1 Drawing Sheet

GOLF BALL

BACKGROUND OF THE INVENTION

This invention relates to an improvement in presently available molded type golf balls.

In order to provide molded golf balls with distance performance approaching top grade wound golf balls, molded type balls have to be made of substantially highly resilient synthetic elastomer compositions such as disclosed in U.S. Pat. Nos. 3,313,545; 3,502,338; 3,534,965; 3,572,721; 3,883,145; and 4,123,061.

Most presently manufactured molded golf balls are made of uniform density material throughout, or with a conventional thin cover encapsulating a uniform density center.

Since presently available molded golf balls have a maximum specific gravity of about 1.196, the instant invention would require a center having a minimum specific gravity of about 1.25 in order to provide a noticeable improvement in aerodynamic characteristics, over cited presently available molded golf balls.

SUMMARY OF THE INVENTION

The intent of this invention is to modify construction of presently available molded type golf balls, in order to more closely duplicate the aerodynamic characteristics of top grade wound golf balls. To accomplish this, the moment of inertia of presently available molded golf balls must be reduced to at least that of wound type golf balls. The moment of inertia of a top grade wound ball is about 0.00106 in-ozs-sec$^2$, and that of a presently available molded ball is about 0.00117 in-ozs-sec$^2$. For optimum performance, a molded ball should duplicate, as close as possible, the trajectory of a top grade wound ball. Due to the difference in weight distribution between the molded ball and the wound ball, the "spin velocity" and the resulting "ball lift" of the molded ball is less than that of the wound ball. Therefore, in order to rectify the discrepancy in "spin velocity" and ultimate "ball lift", weight must be removed from the outer portion of a presently available molded ball and redistributed within the central portion of the ball. To substantiate the result of increased "spin velocity" through a decrease in moment of inertia, the principle of conservation of angular momentum is utilized. Since angular momentum is the product of moment of inertia and angular velocity, it is apparent that when the moment of inertia of a fixed weight ball is decreased, the "spin velocity" increases. Therefore, based on the conservation of angular momentum principle, the "spin velocity" of a presently available molded ball is about 500 RPM less than that of a top grade wound type ball having a "spin velocity" of 5,000 RPM. Also, based on the "Magnus Effect", an increse in "spin velocity" will result in an increase in "ball lift". The production of "lift" by a rotating object operating in a fluid stream, is known as the Magnus Effect. It should be noted that a golf ball must have the proper amount of "lift" for proper trajectory, in order to provide optimum ball carry under all wind conditions. Further, it should be noted that the less dense the encapsulating mass, and the more dense the center of a fixed weight ball is made, the more "ball lift" will result. A ball with increased "lift" will carry further in the presence of a tail wind, and will also have greater stopping action when hitting the green.

A low density syntactic foam composition suitable for use in the instant invention, is disclosed in Schenk U.S. Pat. No. 4,085,937. Also, the highly resilient synthetic elastomer compositions disclosed in above cited prior art patents, can be used by substituting "density reducing fillers such as" granulated cork or hollow spheres of various materials for the dense filler materials used therein.

In the manufacture of balls in accordance with the instant invention, cover 2 and outer core 4 are prepared as uncured thick hemispherical shells. One of the hemispherical shells is first placed in the bottom half of the ball mold, and then a dense center is placed within the concave portion of either cover 2 or outer core 4. Said dense center can be made from steel, lead. brass, zinc, copper, and from a filled elastomer or resin having fillers such as powders of barium sulfate, zinc oxide, lead oxide, etc. Then the other hemispherical shell is placed over the center. The mold is then closed and held under heat and pressure for the required cure time. If cover 5 is used, two thin hemispherical shells can be compression molded around a cured outer core 4. Also, cover 5 may be injection molded around outer core 4. Cover 5 can be made from conventionally used materials such as Surlyn, Ramlon, Dynalon, etc. Since conventional manufacturing processes and techniques known in the art are employed in manufacturing balls of the instant invention, a detailed manufacturing procedure would serve as redundant disclosure.

Terms herein used should be construed as follows;
1. Encapsulating Mass—It is defined to encompass the element or elements surrounding the ball's center.
2. Synthetic Elastomer Composition—It is defined as any material similar to modified or unmodified forms of the compositions disclosed in the herein cited prior art patents.
3. Syntactic Foam—It is defined as a low density composition consisting of granulated cork or hollow spheres of either phenolic, epoxy, ceramic or glass, dispersed within a resilient elastomer.

DESCRIPTION OF THE PREFERRED EMBODIMENTS

I. Two-piece Molded Ball

Figure 1:
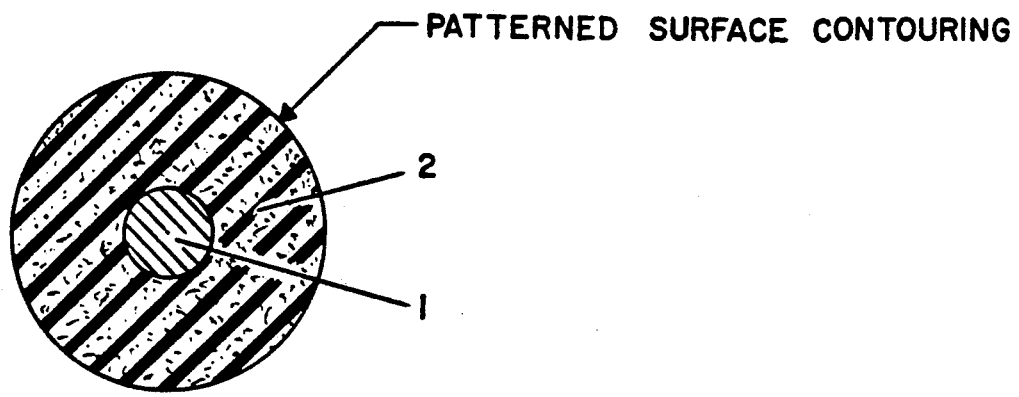
FIG. 1 depicts a cross sectional view of a two piece molded golf ball, consisting of a center surrounded by a cover.

This embodiment is depicted in FIG. 1 and is constructed as a two-piece unit featuring a high density center 1 of steel, encapsulated by cover 2 of low density resilient syntactic foam composition. Contained within the surface of cited cover 2, is a patterned surface contouring such as dimples.

II. Three-piece Molded Ball

Figure 2:
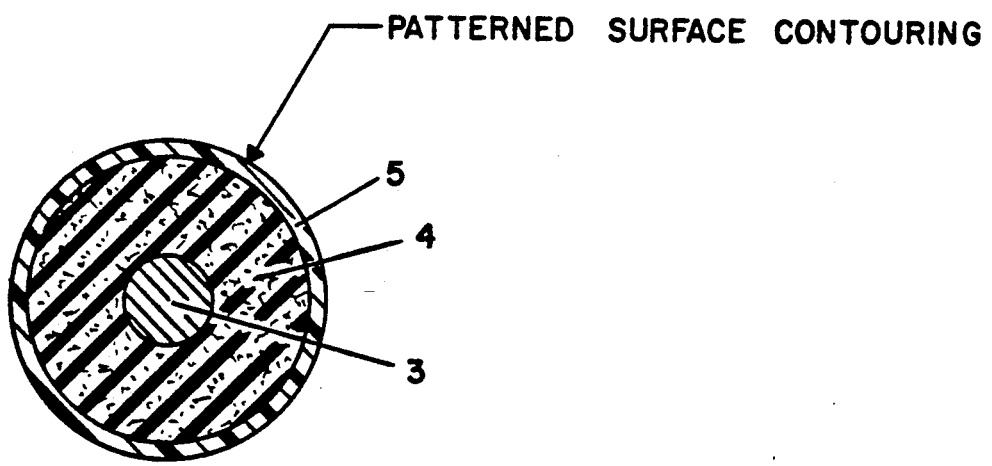
FIG. 2 depicts a cross sectional view of a three piece molded golf ball, consisting of a center surrounded by an outer core and a cover.

This embodiment is depicted in FIG. 2 and is constructed as a three-piece unit featuring a high density center 3 of steel, surrounded by an outer core 4 of low density resilient syntactic foam composition, and encapsulated by a Surlyn cover 5 having a patterned surface contouring such as dimples.

Having thusly described the invention, the following is claimed:

1. A molded golf ball, comprising:
   a) a center of substantially high density;
   b) a molded encapsulating mass surrounding said center, wherein the material adjacent to said center is further characterized as a resilient synthetic elastomer composition including a density reducing filler;
   c) and a patterned surface contouring of predetermined structure, contained within the outer surface of said golf ball;
   d) said density of said center being greater than the density of said encapsulating mass.

2. The golf ball defined in claim 1, wherein said center is further characterized as a steel ball.

3. The golf ball defined in claim 2, wherein said encapsulating mass is further characterized as a cover made from a resilient syntactic foam composition.

4. The golf ball defined in claim 2, wherein said molded encapsulating mass is further characterized as an outer core and a cover.

5. The golf ball defined in claim 4, wherein said outer core is further characterized as being made from a resilient syntactic foam composition.

* * * * *